US010112485B2

(12) United States Patent
Homsangpradit et al.

(10) Patent No.: US 10,112,485 B2
(45) Date of Patent: Oct. 30, 2018

(54) CHASSIS MONITORING SYSTEM HAVING OVERLOAD DETECTION

(71) Applicant: Faraday & Future Inc., Gardena, CA (US)

(72) Inventors: Brian Andrew Homsangpradit, Long Beach, CA (US); Benjamin Charles Tarloff, Redondo Beach, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 131 days.

(21) Appl. No.: 15/157,238

(22) Filed: May 17, 2016

(65) Prior Publication Data

US 2017/0334290 A1 Nov. 23, 2017

(51) Int. Cl.
| B60K 28/08 | (2006.01) |
| B60K 28/10 | (2006.01) |
| B60W 30/02 | (2012.01) |
| B60W 40/13 | (2012.01) |
| B60W 50/00 | (2006.01) |

(52) U.S. Cl.
CPC ............. *B60K 28/08* (2013.01); *B60K 28/10* (2013.01); *B60W 30/02* (2013.01); *B60W 40/13* (2013.01); *B60W 50/0098* (2013.01)

(58) Field of Classification Search
None
See application file for complete search history.

(56) References Cited

U.S. PATENT DOCUMENTS

| 5,586,032 | A | * | 12/1996 | Kallenbach | .......... | B60G 17/018 |
| | | | | | | 180/197 |
| 5,601,307 | A | * | 2/1997 | Heyring | .............. | B60G 17/015 |
| | | | | | | 280/6.157 |
| 7,142,102 | B2 | * | 11/2006 | Darroman | ........... | B60C 23/0408 |
| | | | | | | 340/440 |
| 7,437,920 | B2 | * | 10/2008 | Beverly | ............... | B60C 23/002 |
| | | | | | | 152/417 |
| 7,693,626 | B2 | * | 4/2010 | Breed | ................. | B60C 23/0408 |
| | | | | | | 701/34.4 |
| 8,096,174 | B2 | * | 1/2012 | Katou | ..................... | B60C 23/04 |
| | | | | | | 73/146.3 |
| 8,150,613 | B2 | * | 4/2012 | Engelhard | .......... | G01G 23/3735 |
| | | | | | | 180/290 |
| 8,958,940 | B2 | * | 2/2015 | Kawasaki | ............. | B60C 23/062 |
| | | | | | | 701/1 |
| 9,310,242 | B2 | * | 4/2016 | Kammann | .......... | B60C 23/0408 |
| 2016/0164134 | A1 | * | 6/2016 | Forster | ............. | H01M 10/0436 |
| | | | | | | 429/7 |

* cited by examiner

*Primary Examiner* — Peter Macchiarolo
*Assistant Examiner* — Jermaine Jenkins
(74) *Attorney, Agent, or Firm* — Skyler R. Lund

(57) ABSTRACT

A monitoring system is disclosed for use with a rolling chassis of a vehicle. The monitoring system may include a tire sensor configured to generate a first signal indicative of a current tire condition of the rolling chassis, and a load sensor configured to generate a second signal indicative of an actual load placed on the rolling chassis. The monitoring system may also include a controller in communication with the tire sensor and the load sensor. The controller may be configured to determine based on the first signal a theoretical load that the rolling chassis is capable of supporting given the current tire condition. The controller may also be configured to make a first comparison of the actual load with the theoretical load, and to selectively generate a first alert based on the first comparison.

18 Claims, 3 Drawing Sheets

CHASSIS MONITORING SYSTEM HAVING OVERLOAD DETECTION

TECHNICAL FIELD

The present disclosure relates generally to a chassis monitoring system, and more particularly, to a chassis monitoring system having overload protection.

BACKGROUND

Vehicles (e.g., passenger cars, trucks, vans, busses, etc.) are designed to safely support a maximum load when the tires of the vehicle are filled with air to an established pressure level. As the air pressure of the tires reduces below the established pressure level, the capacity of the vehicle to safely support a load also reduces.

Most modern vehicles are equipped with a tire pressure monitoring system that is configured to alert a vehicle operator when an air pressure of a particular tire reduces below a low-threshold limit. The low-threshold limit may be a limit at which too much of the tire contacts a ground surface, thereby increasing friction of the tire and a corresponding risk of tire rupture. Unfortunately, situations may arise where the air pressure of one or more of the tires of a vehicle are insufficient for a given loading condition of the vehicle, but yet above a level for a conventional tire pressure monitoring system to alert the operator of the situation.

The disclosed chassis monitoring system is directed to mitigating or overcoming one or more of the problems set forth above and/or other problems in the prior art.

SUMMARY

One aspect of the present disclosure is directed to a monitoring system for a rolling chassis of a vehicle. The monitoring system may include a tire sensor configured to generate a first signal indicative of a current tire condition of the rolling chassis, and a load sensor configured to generate a second signal indicative of an actual load placed on the rolling chassis. The monitoring system may also include a controller in communication with the tire sensor and the load sensor. The controller may be configured to determine based on the first signal a theoretical load that the rolling chassis is capable of supporting given the current tire condition. The controller may also be configured to make a first comparison of the actual load with the theoretical load, and to selectively generate a first alert based on the first comparison.

Another aspect of the present disclosure is directed to a method for monitoring loading of a rolling chassis. The method may include detecting a current tire condition of the rolling chassis, and detecting an actual load placed on the rolling chassis. The method may also include determining a theoretical load that the rolling chassis is capable of supporting given the current tire condition, making a first comparison of the actual load with the theoretical load, and selectively alerting an operator based on the first comparison.

Yet another aspect of the present disclosure is directed to a vehicle. The vehicle may include a rolling chassis having a frame, a plurality of tires, and an air suspension with a plurality of air springs disposed between the frame the plurality of tires. The vehicle may further include a body operatively connected to the frame, and a power train mounted to the frame and configured to drive the plurality of tires. The vehicle may also include a plurality of tire sensors, each associated with a corresponding tire of the plurality of tires and configured to generate a first signal indicative of at least one of a pressure and a temperature of the corresponding tire. The vehicle may additionally include a plurality of load sensors, each associated with a corresponding air spring of the suspension and configured to generate a second signal indicative of a change in pressure resulting from an actual load being placed on the rolling chassis. The vehicle may further include a controller in communication with the plurality of tire sensors and the plurality of load sensors. The controller may be configured to determine based on the first signals a theoretical load that the rolling chassis is capable of supporting given the pressures and temperatures of the plurality of tires, and to make a first comparison of the actual load with the theoretical load. The controller may also be configured to selectively generate a first alert based on the first comparison, to make a second comparison of the actual load with a maximum load, and to selectively generate a second alert based on the second comparison, regardless of the first signals.

DETAILED DESCRIPTION

The disclosure is generally directed to a system that may be used to regulate loading conditions of a vehicle. The system may detect loading and tire conditions of the vehicle's chassis. The system may then compare the detected loading to load limits of the chassis for the given tire conditions, and selectively generate alerts based on the comparison.

Figure 1:
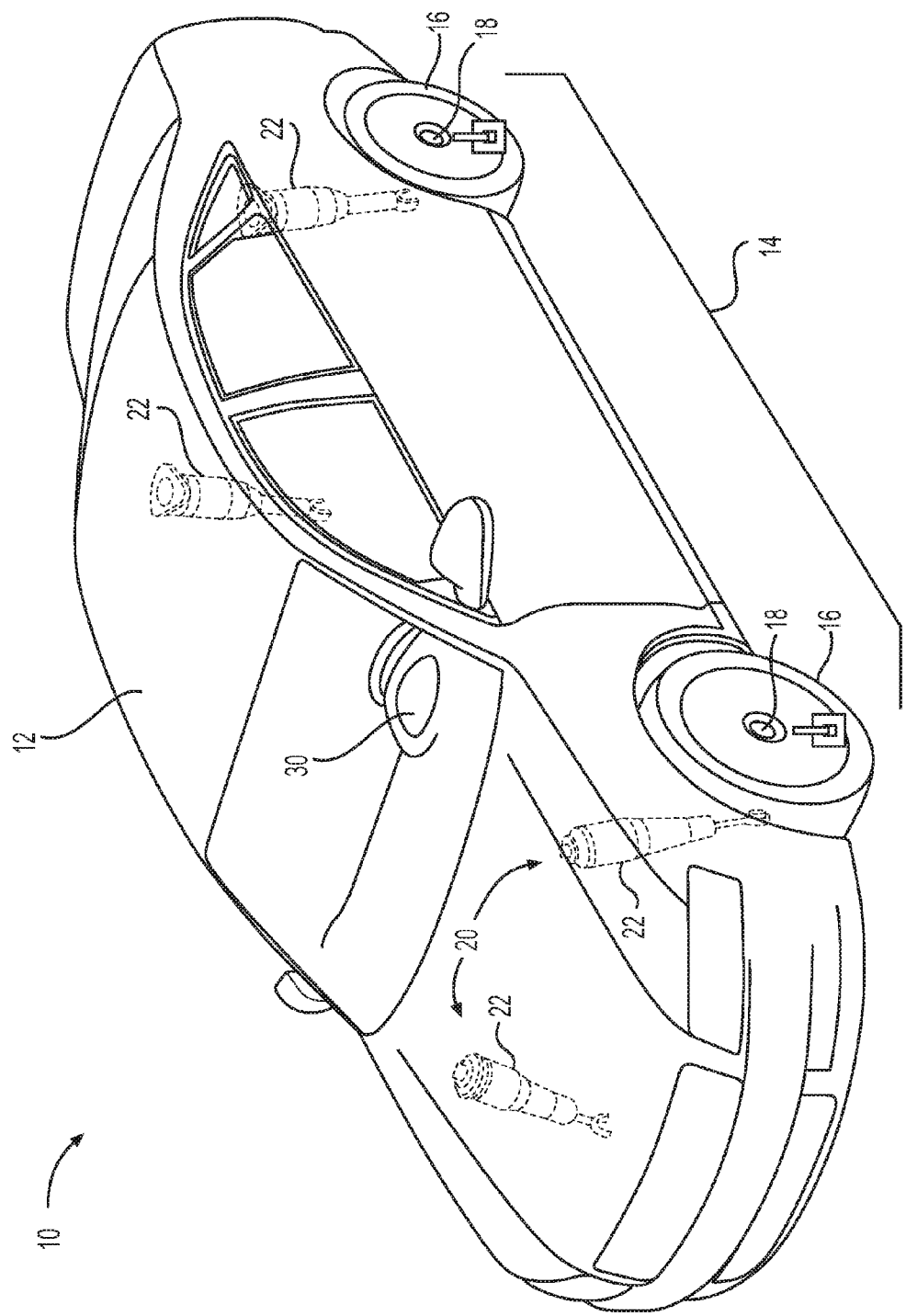
FIG. 1 is a perspective view illustration of an exemplary disclosed vehicle.

FIG. 1 is a perspective view illustration of an exemplary vehicle 10. Although vehicle 10 is shown as a car in FIG. 1, it is contemplated that vehicle 10 may alternatively be a pickup truck, a motorcycle, a utility vehicle, a van, or of any other body style. It is further contemplated that vehicle 10 may be an electric vehicle, a fuel-cell vehicle, a conventional combustion-powered vehicle, or a combination thereof. Vehicle 10, as is known in the art, may include a body 12 operatively connected to and supported by a rolling chassis 14. Rolling chassis 14 may include, among other things, a plurality of tires 16 (e.g., four tires—one located at each corner of vehicle 10), a drivetrain 18 (e.g., an engine, a transmission, axles, driveshafts, etc.) configured to drive tires 16, and a suspension 20 operatively connecting body 12 to tires 16.

For the purposes of this disclosure, suspension 20 may be considered a conventional air suspension. In particular, suspension 20 may include any number of air springs 22 (e.g., bags, bellows, cylinders, or combinations of these and other pneumatic devices). In the disclosed example, four air springs 22 are included, each paired with a corresponding tire 16 located at a corner of vehicle 10. Air springs 22 may function similar to earlier-used steel springs, to cushion vertical movements of body 12. In addition, the amount and/or pressure of air contained inside air springs 22 can be selectively adjusted to thereby adjust a stiffness of suspension 20 and/or a ride height of vehicle 10 (i.e., a height of body 12 above rolling chassis 14).

As vehicle 10 is loaded (e.g., as passengers climb into body 12 and/or as cargo is placed inside of a trunk of body 12), air springs 22 may compress somewhat. This compression of air springs 22 may result in a lowering of body 12 toward a ground surface. The vertical height change of body 12 may be detectable, and additional air may be forced into air springs 22 based on the detected change. This additional air may function to increase a pressure inside of air springs 22, thereby causing air springs 22 to expand. This expansion may cause a raising of body 12 back to a nominal ride height of vehicle 10. Accordingly, a change in pressure within air springs 22 may be related to loading of vehicle 10. For example, an increase in air pressure within air springs 22 may correspond with an increase in loading, while a decrease in the air pressure may correspond with a decrease in loading.

Vehicle 10 may have a maximum limit on the amount of load that can be placed into or on body 12. The maximum loading limit may be associated with safe, comfortable, and/or responsive handling of vehicle 10. For example, the maximum loading limit may be a limit on loading that results from a capacity of vehicle 10 to accelerate and/or brake in a designed manner. In another example, the maximum loading limit may be a limit on loading that results from a capacity of suspension 20 to maintain the nominal ride height or a designed stiffness. In yet another example, the maximum loading limit may be a limit on loading that results from a design limit of tires 16. In still another example, the maximum loading limit may be a limit on loading that results from an external regulation (e.g., a government mandated road or bridge weight limit). It is contemplated that the maximum loading limit of vehicle 10 may be affected by any combination of these and other factors.

Although tires 16 can theoretically support the maximum loading limit, tires 16 practically support a lesser load under most conditions. The practical load limits of tires 16 may be lower than the theoretical maximum loading limit as a result of certain vehicle conditions (e.g., a lower tire air pressure and/or a higher tire temperature) of tires 16. In particular, tires 16 may be configured to properly support the maximum loading limit of vehicle 10 only when tires 16 are filled to a designed air pressure level. However, as the air pressure within tires 16 reduces away from the designed air pressure level, tires 16 may begin to sag. The sagging of tires 16 may result in a greater area of tires 16 contacting a ground surface, which causes an increase in friction therebetween. This increase in friction may result in an increase in tire temperature and a corresponding greater likelihood of tire rupture. Accordingly, as air pressure within each tire 16 reduces and/or the temperature of each tire 16 increases, the amount of load that can be safely carried (i.e., carried without undue risk of rupture) by each tire 16 also reduces. In other words, for a given pressure within and/or temperature of tires 16, tires 16 may be configured to safely support a theoretical load that is equal to or less than the maximum loading limit of vehicle 10. As a result, tires 16 may be overloaded, even though the maximum loading limit of vehicle 10 has not been exceeded.

In some situations, a particular tire 16 having the same internal air pressure as the other tires 16 of vehicle 10 may be overloaded while the other tires 16 are not. Specifically, when a load is unequally distributed inside body 12, some tires 16 may be more heavily loaded than other tires 16. For example, when a rear seat area and trunk of body 12 are fully loaded (e.g., in a van embodiment), the rear tires 16 may be carrying a greater proportion of the overall load than the front tires 16. In this situation, even though the maximum load limit of vehicle 10 may not be exceeded and even though all tires 16 may have the same internal air pressure, the rear tires 16 may be loaded too heavily for their current conditions (i.e., pressures and/or temperatures). In this situation, the rear tires 16 could have an elevated risk of rupture.

Figure 2:
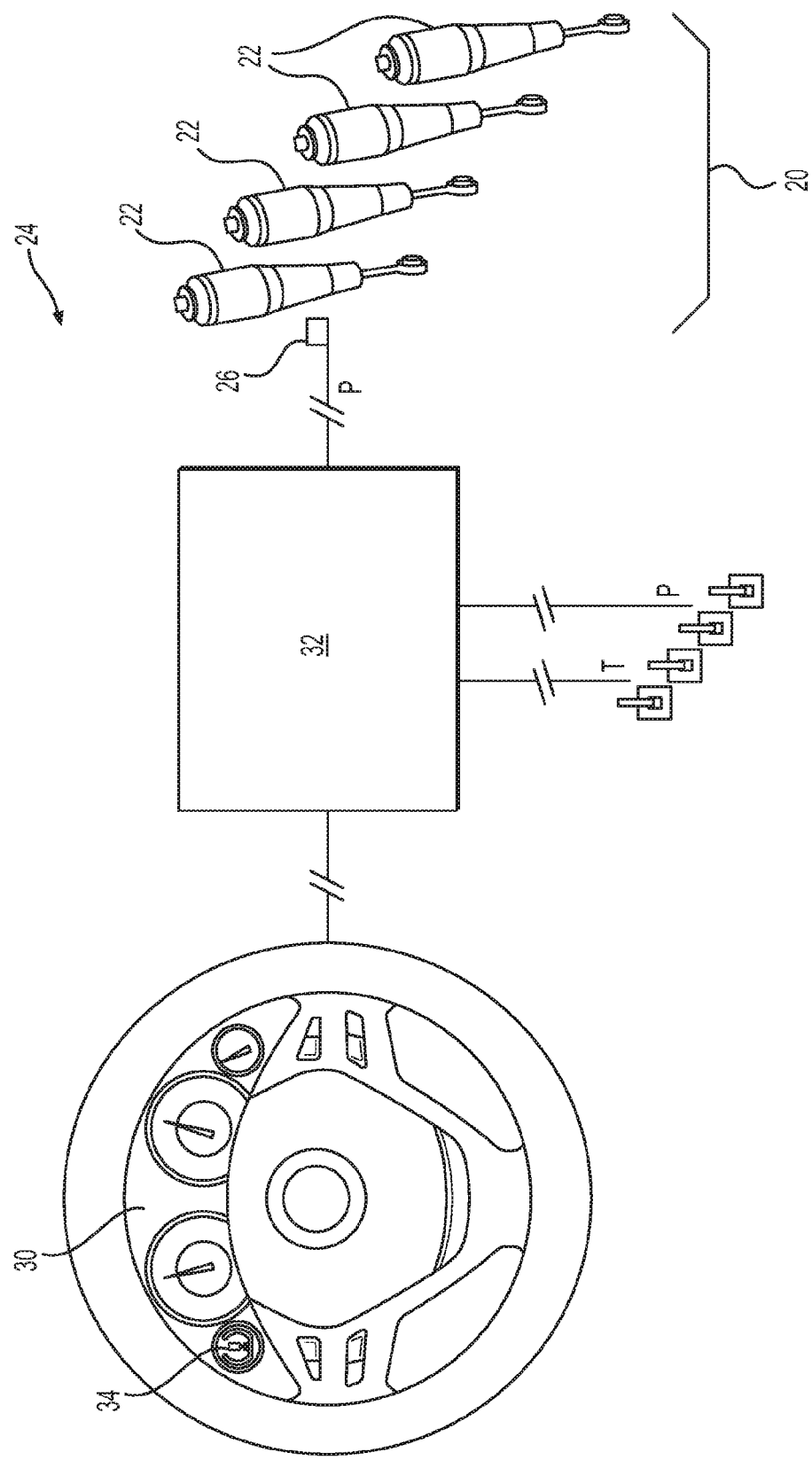
FIG. 2 is a diagrammatic illustration of an exemplary disclosed chassis monitoring system that may be used in conjunction with the vehicle of FIG. 1.

FIG. 2 is a diagrammatic illustration of an exemplary system 24 that may be used to monitor and regulate the loading of vehicle 10. System 24 may include at least one load sensor 26 associated with suspension 20 (e.g., one sensor 26 for each air spring 22), at least one tire sensor 28 associated with tires 16 (e.g., one sensor 28 for each tire 16), a display 30, and a controller 32. As will be explained in more detail below, controller 32 may determine actual loading of vehicle 10 based on signals generated by load sensor(s) 26, determine a theoretical loading capacity of vehicle 10 base on signals generated by tire sensor(s) 28, and selectively generate alerts and show them on display 30 based on a comparison of the actual loading and the theoretical loading capacity.

Load sensor 26 may be configured to generate a load signal indicative of an amount of load (e.g., a weight of passengers and/or cargo) placed into and/or on body 12. In the disclosed embodiment, load sensor 26 is a pressure sensor normally used for height and/or ride control of suspension 20. For example, each load sensor 26 may be placed in communication with the air inside of or otherwise supplied to a corresponding air spring 22. The load signal generated by load sensor 26 may correlate to a pressure of the air, and may be directed to controller 32 for further processing.

Tire sensor 28 may be configured to generate a condition signal indicative of a condition (e.g., a pressure and/or a temperature) of the associated tire 16. For example, each tire sensor 28 may include a wireless pressure transducer and/or a wireless temperature transducer, each capable of remotely broadcasting a corresponding tire condition signal from inside of tire 16. The tire condition signals may be received by controller 32 for further processing.

Display 30 may include one or more monitors (e.g., a liquid crystal display (LCD), a cathode ray tube (CRT), a plasma display, a touch-screen, a portable hand-held device, or any such display device known in the art) configured to actively and responsively show alerts (e.g., instructions and/or warnings) related to the loading of vehicle 10. Display 30 is typically disposed in close proximity to a driver's area inside body 12 and within the view of the driver. For example, display 30 may be included within an instrument cluster in the dashboard of vehicle 10. Display 30 may be connected to controller 32, and controller 32 may execute instructions to render graphics and images on display 30 based on the signals from sensors 26 and 28. Although in the disclosed embodiment, display 30 is used to display the alerts visually, it is contemplated that the alerts can be presented as an audible sound, or a combination of a visual display and an audible sound.

Controller 32 may embody a single processor or multiple processors that include a means for controlling an operation of system 24. Controller 32 may include one or more general or special purpose processors or microprocessors. Controller 32 may further include or be associated with a memory for storing data such as, for example, design limits, performance characteristics, operational instructions, and corresponding parameters of each component of system 24. Various other known circuits may be associated with controller 32, including power supply circuitry, signal-conditioning circuitry, solenoid driver circuitry, communication circuitry, and other appropriate circuitry. Moreover, controller 32 may be capable of communicating with other components of system 24 via wired and/or wireless transmission.

Figure 3:
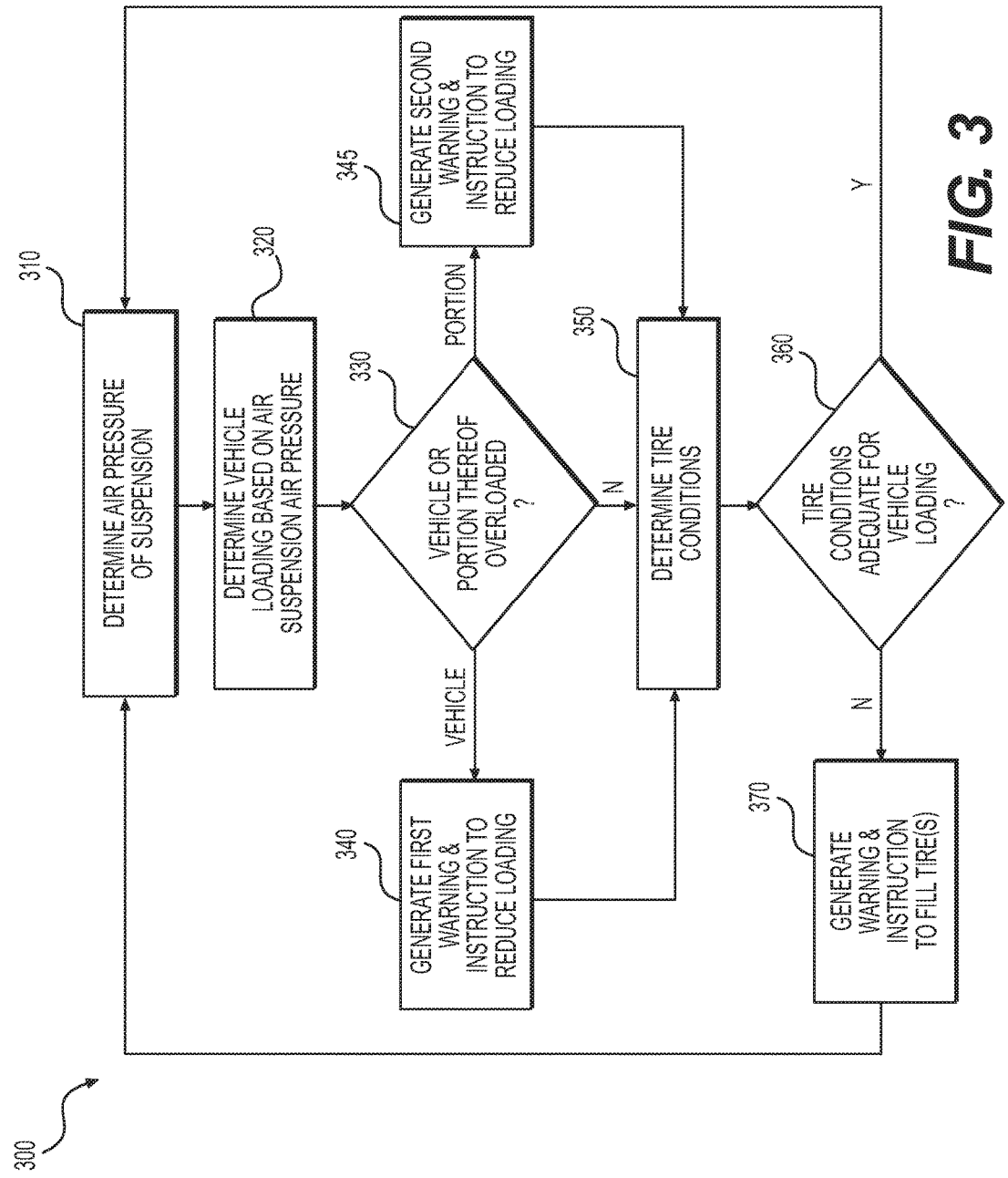
FIG. 3 is a flowchart illustrating an exemplary process that may be performed by the chassis monitoring system of FIG. 2.

One or more maps may be stored in the memory of controller 32 and used during completion of the exemplary method shown in FIG. 3. Each of these maps may include a collection of data in the form of lookup tables, graphs, and/or equations. In the disclosed embodiment, at least two different maps are used by controller 32, including a first map that relates the signals from load sensor(s) 26 to an actual loading of vehicle 10, and a second map that relates the tire condition signals from tire sensor(s) 28 to theoretical loading of vehicle 10 that can be properly supported by tires 16.

FIG. 3 provides a flowchart illustrating an exemplary method 300 of control that may be performed by system 24 of FIG. 2. As shown in this flowchart, method 300 may begin with controller 32 determining the air pressure of suspension 20 (Step 310). In particular, the load signals generated by each of load sensors 26 may be received by controller 32 and used to determine the corresponding air pressures within each of air springs 22. Controller 32 may then determine a load on vehicle 10 based on a deviation of the detected air pressures from nominal air pressure values stored in memory that correspond with an empty weight of body 12 (Step 320). In the disclosed example, the air pressure deviation measured at each air spring 22 by each load sensor 26 may be used to determine a weight of a load supported by only that particular air spring 22. Each of these separate weights may then be summed to determine a total weight of the load on body 12.

Controller 32 may compare the total weight of the load acting on body 12 to the maximum load limit of vehicle 10 to determine if vehicle 10 is overloaded (Step 330). In some embodiments, controller 32 may additionally or alternatively compare at step 330 the separate load weights acting on each corner of body 12 (i.e., via each air spring 22) to maximum load limits for each corner to determine if any one portion of vehicle 10 is overloaded (e.g., when the load on vehicle 10 is not necessarily excessive, but instead just poorly distributed).

If the comparison of the total actual load with the maximum load limit of vehicle 10 indicates that vehicle 10, as a whole, has been overloaded, controller 32 may generate a first alert on display 30 (Step 340). The first alert may include, among other things, a warning and an instruction for the operator to remove some portion of the load acting on body 12. However, if the comparison of each corner load with separate corner load limits indicates overloading of only one or more portions of vehicle 10, a second alert, which is different from the first alert, may be shown on display 30 (Step 345). This alert may include, among other things, a warning and an instruction for the operator to redistribute the load.

Controller 32 may also be configured to determine the conditions of tires 16 (Step 350). In the disclosed embodiment, this may include determining both a pressure and a temperature of each tire 16 via tire sensors 28. In other embodiments, however, controller 32 may determine only tire pressure or only tire temperature at step 350. It should be noted that, although step 350 is shown as occurring after steps 320-345, step 350 could alternatively be performed before or simultaneously with steps 320-345, if desired.

Regardless of the order of steps 320-350, after completion of these steps, controller 32 may determine if the tire conditions determined at step 350 are adequate to support the current loading of vehicle 10 (Step 360). This determination may be made, for example, by referencing the current tire condition(s) with the map stored in memory to find a theoretical load that can safely be supported by tires 16. If the actual load of vehicle 10 is equal to or less than the theoretical load, no additional control steps may be taken, and control may return to step 310 and method 300 may be repeated.

However, if, at step 350, controller 32 determines that the actual load of vehicle 10 is greater than the theoretical load for any one tire 16, controller 32 may generate a warning indicating only that the air pressure of tires 16 should be increased, so as to increase the theoretical load capacity of tires 16 to a level above the actual load (Step 370). Control may loop from step 370 back to step 310. By following method 300 shown in FIG. 3, safe, comfortable, and/or responsive handling of vehicle 10 may be ensured.

It will be apparent to those skilled in the art that various modifications and variations can be made to the disclosed monitoring system and related method. Other embodiments will be apparent to those skilled in the art from consideration of the specification and practice of the disclosed monitoring system and related method. For example, in some embodiments, controller 32 may additionally generate a warning based on only tire temperature, if desired. This warning may indicate that the temperature of any one tire 16 is excessive, and controller 32 may instruct the operator to remove load, redistribute load, increase tire pressure, inspect tire 16, and/or change operation of (e.g., slow down) vehicle 10. It is intended that the specification and examples be considered as exemplary only, with a true scope being indicated by the following claims and their equivalents.

What is claimed is:

1. A monitoring system for a rolling chassis, comprising:
   a tire sensor configured to generate a first signal indicative of a current tire condition of the rolling chassis;
   a first load sensor associated with a first air spring of the rolling chassis configured to generate a second signal indicative of an actual load placed on the rolling chassis;
   at least a second load sensor associated with a second air spring of the rolling chassis that is configured to generate a third signal indicative of the actual load on the rolling chassis; and
   a controller in communication with the tire sensor and the load sensor, the controller being configured to:
      determine based on the first signal a theoretical load that the rolling chassis is capable of supporting given the current tire condition;
      make a first comparison of the actual load with the theoretical load; and
      selectively generate a first alert based on the first comparison;
      determine imbalanced loading of the rolling chassis based on the first and third signals; and
      selectively generate a second alert based on the second comparison.

2. The monitoring system of claim 1, wherein the current tire condition includes at least one of a tire pressure and a tire temperature.

3. The monitoring system of claim 2, wherein the current tire condition includes both the tire pressure and the tire temperature.

4. The monitoring system of claim 2, wherein the first load sensor is a pressure sensor associated with a suspension of the rolling chassis.

5. The monitoring system of claim 4, wherein the second signal generated by the pressure sensor relates to a change in air pressure required by the suspension to maintain a neutral height of the rolling chassis above a ground surface when the actual load is placed on the rolling chassis.

6. The monitoring system of claim 1, wherein the controller is configured to determine the actual and theoretical loads by referencing the first and second signals with at least one map stored in a memory associated with the controller.

7. The monitoring system of claim 1, wherein the controller is further configured to:
- make a third comparison of the actual load with a maximum load; and
- selectively generate a third alert based on the third comparison, regardless of the first signal.

8. The monitoring system of claim 7, wherein the first alert is an alert instructing an operator to adjust tire pressure.

9. The monitoring system of claim 8, wherein the third alert is an alert instructing an operator to decrease loading of the rolling chassis.

10. The monitoring system of claim 8, wherein the controller is further configured to selectively generate an alert informing the operator of an elevated tire temperature based on the first signal.

11. The monitoring system of claim 1, wherein the second alert is an alert instructing the operator to redistribute the actual load on the rolling chassis.

12. A method of monitoring loading of a rolling chassis, comprising:
- detecting a current tire condition of the rolling chassis;
- detecting an actual load placed on the rolling chassis;
- determining a theoretical load that the rolling chassis is capable of supporting given the current tire condition;
- making a first comparison of the actual load with the theoretical load; and
- selectively alerting an operator based on the first comparison
- detecting an actual load placed on the rolling chassis includes detecting a first pressure of a first air spring of the rolling chassis;
- the method further includes detecting a second pressure of a second air spring of the rolling chassis;
- determining imbalanced loading of the rolling chassis based on the first and second pressures; and
- responsively instructing the operator to redistribute the actual load on the rolling chassis.

13. The method of claim 12, wherein the current tire condition includes at least one of a tire pressure and a tire temperature.

14. The method of claim 13, wherein detecting the actual load includes detecting a suspension pressure of the rolling chassis.

15. The method of claim 12, wherein selectively alerting the operator based on the first comparison includes instructing the operator to adjust tire pressure.

16. The method of claim 15, further including:
- making a second comparison of the actual load with a maximum load; and
- instructing the operator to decrease loading of the rolling chassis based on the second comparison, regardless of the current tire condition.

17. The method of claim 12, wherein the controller is configured to determine the theoretical load by referencing the tire condition with at least one map stored in memory.

18. A vehicle, comprising:
- a rolling chassis having a plurality of tires and an air suspension with a plurality of air springs;
- a body operatively connected to the rolling chassis via the air suspension;
- a plurality of tire sensors, each associated with a corresponding tire of the plurality of tires and configured to generate a first signal indicative of at least one of a pressure and a temperature of the corresponding tire;
- a plurality of load sensors, each associated with a corresponding air spring of the suspension, including a first load sensor associated with a first air spring and configured to generate a second signal indicative of a change in pressure resulting from an actual load being placed on the rolling chassis and a second load sensor associated with a second air spring and configured to generate a third signal indicative of the actual load on the rolling chassis; and
- a controller in communication with the plurality of tire sensors and the plurality of load sensors, the controller being configured to:
  - determine based on the first signals a theoretical load that the rolling chassis is capable of supporting given the pressures and temperatures of the plurality of tires;
  - make a first comparison of the actual load with the theoretical load;
  - selectively generate a first alert based on the first comparison;
  - determine imbalanced loading of the rolling chassis based on the first and third signals;
  - selectively generate a second alert based on the second comparison
  - make a third comparison of the actual load with a maximum load; and
  - selectively generate a third alert based on the third comparison, regardless of the first signals.

* * * * *